United States Patent
Agarwal et al.

(10) Patent No.: US 7,251,822 B2
(45) Date of Patent: Jul. 31, 2007

(54) SYSTEM AND METHODS PROVIDING ENHANCED SECURITY MODEL

(75) Inventors: Sameet H. Agarwal, Redmond, WA (US); Balan Sethu Raman, Redmond, WA (US); Sanjay Anand, Sammamish, WA (US); Paul J. Leach, Seattle, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 72 days.

(21) Appl. No.: 10/691,999

(22) Filed: Oct. 23, 2003

(65) Prior Publication Data

US 2005/0091518 A1  Apr. 28, 2005

(51) Int. Cl.
G06F 17/30 (2006.01)
G06F 7/00 (2006.01)

(52) U.S. Cl. .............. 726/1; 726/26; 707/1; 707/9; 707/100

(58) Field of Classification Search .......... 707/1–10, 707/100, 200; 713/200
See application file for complete search history.

(56) References Cited

U.S. PATENT DOCUMENTS

| | | | |
|---|---|---|---|
| 5,987,506 A * | 11/1999 | Carter et al. ............ | 709/213 |
| 6,148,377 A * | 11/2000 | Carter et al. ............ | 711/147 |
| 6,233,576 B1 | 5/2001 | Lewis | |
| 6,321,334 B1 | 11/2001 | Jerger et al. | |
| 6,345,361 B1 | 2/2002 | Jerger et al. | |
| 6,347,376 B1 | 2/2002 | Attwood et al. | |
| 6,466,932 B1 * | 10/2002 | Dennis et al. ............ | 707/3 |
| 6,498,612 B1 | 12/2002 | Brown et al. | |
| 6,574,736 B1 | 6/2003 | Andres | |
| 6,772,350 B1 * | 8/2004 | Belani et al. ............ | 713/202 |
| 7,120,698 B2 * | 10/2006 | Krishnapuram et al. ... | 709/229 |
| 7,133,914 B1 * | 11/2006 | Holbrook ................ | 709/224 |
| 2002/0152226 A1 | 10/2002 | Burnett | |
| 2003/0084256 A1 * | 5/2003 | McKee ................... | 711/152 |
| 2003/0105771 A1 * | 6/2003 | Tiefenbrun et al. ...... | 707/103 R |
| 2003/0188198 A1 * | 10/2003 | Holdsworth et al. ...... | 713/201 |
| 2003/0217033 A1 * | 11/2003 | Sandler et al. ........... | 707/1 |

OTHER PUBLICATIONS

Laurence Cholvy, et al., Analyzing Consistency of Security Policies, 1997 IEEE Symposium on Security and Privacy, May 4-7, 1997, pp. 1-9, Oakland, CA.
Brian Johnson, International Search Report Apr. 26, 2005. 3 pages.

* cited by examiner

Primary Examiner—Kim Vu
Assistant Examiner—Ponnoreay Pich
(74) Attorney, Agent, or Firm—Amin, Turocy & Calvin, LLP

(57) ABSTRACT

The present invention relates to a system and methodology to facilitate security for data items residing within (or associated with) a hierarchical database or storage structure. A database security system is provided having a hierarchical data structure associated with one or more data items. The system includes a security component that applies a security policy to the data items from a global location or region associated with a database. Various components and processes are employed to enable explicit and/or inherited security properties to be received by and propagated to the data items depending on the type of data structure encountered or processed.

18 Claims, 9 Drawing Sheets

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GR | GW | GE | GA | Reserved | | | | AS | Standard Access Rights | | | | | | | Object-Specific Access Rights | | | | | | | | | | | | | | | |

← 400

GR → Generic_Read
GW → Generic_Write
GE → Generic_Execute
Ga → Generic_ALL
AS → Right to access SACL

FIG. 4

SYSTEM AND METHODS PROVIDING ENHANCED SECURITY MODEL

TECHNICAL FIELD

The present invention relates generally to computer systems, and more particularly to a system and method that employs an enhanced security model in accordance with hierarchically arranged data items.

BACKGROUND OF THE INVENTION

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the heart of these systems include sophisticated operating systems that manage not only computer-related hardware but, a vast array of software components having various relationships. These components are often described in terms of objects or classes having multi-tiered relationships such as in a hierarchical tree arrangement for files and directories that are found in many data management systems.

Emerging technologies have spawned other type structures and models for storing and managing objects within a database. These include such hierarchical structures as containment hierarchies that enable multiple relationships between respective items or objects. Such hierarchies are often modeled as a Directed Acyclic Graph (DAG) and support multiple path relationships to an item from a root node of the containment hierarchy. Regardless of the type of data structure involved, however, security models have been applied to these systems to determine and facilitate how entities (e.g., users or other components) are permitted access to objects or items residing in the respective structures.

In many aspects, current security models limit the effectiveness of operating systems to manage data both securely and efficiently. For example, one security model implements security by associating an Access Control List (ACL) with every file or directory in a hierarchy. An inheritance model then provides support for specifying a default ACL for newly created items in a directory, but subsequently if the ACL on a directory is changed, the files and folders contained in the hierarchy under that directory are not automatically updated. Also, ACL's specified at any directory can be propagated using higher-level API's, for example. Consequently, every item can override security policy above it and specify an ACL at its level that either explicitly blocks further inheritance from above, or merely re-inherits when a newly created ACL propagates down the hierarchy. Unfortunately, at a volume level, since there is no single place where these different security policies are tracked, (they are generally tracked per-item), it is exceedingly difficult if not impossible to determine a resultant security policy at that level.

As mentioned above, if a new ACL is specified at a directory, it can be propagated down the hierarchy but this usually entails running operations on every file and directory in that hierarchy. For significantly large volumes, this can take an inordinate amount of time. It is noted that even single-instancing ACL's do not alleviate this issue since single-instancing occurs regardless of containment paths. Thus, if two hierarchies happened to have the same ACL on its contained items, and if policy on one of them changed, it would be incorrect to simply update the single-instance table since that would change the policy on the other hierarchy as well.

Other problems with current security models involve the presence of hard links between items that present semantic problems when considered in conjunction with ACL inheritance. For example, when an Item is created under a Folder1, it receives a default ACL1 from Folder1. Creation of a subsequent link to the Item from a Folder2 does not change the security. However, if a new ACL3 on Folder2 is applied to its hierarchy, it changes the ACL on the Item as well. Subsequently, if a new ACL is applied on Folder1, it then inherits down to the Item. Consequently, who or whatever happens to write last overwrites the existing inherited ACL's. This type of security arrangement is at least confusing and more often unpredictable which is highly undesirable.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that provide a predictable and globalized security model for hierarchically arranged data items. Such hierarchies can include substantially any type of hierarchically arranged items such as common tree structures or more elaborate data structures such as a Directed Acyclic Graph (DAG), for example. In one aspect, a security component is provided that enables security policies to be applied in more global manner such as from one or more security regions that are mapped within a database. These policies can include explicitly defined policies and/or more generalized policies that can be inherited from various portions of a path or region associated with the type of data structure involved (e.g., security policies applied in one manner for a tree structure and a subsequent manner for a containment hierarchy). Since respective security policies are applied at a regional or global level of a database as opposed to applying a separate security file per data item within a hierarchical structure, the present invention significantly increases database performance. Performance increases are achieved by mitigating computing operations associated with conventional system security models that create/manage a plurality of isolated security files that also continue to increase in quantity as data items are added to the database.

In another aspect of the present invention, various components and processes are provided to enable security policies to automatically be associated with database items. These components define a security model that maps a security policy to a respective item depending on the type of data structure employed. For example, in one type of database, a containment hierarchy may include various holding relationships between items appearing in the hierarchy. The holding relationship may be employed to propagate a security policy for a respective item, wherein the policy may include both an explicit portion (e.g., defined by a system administrator) and an inherited portion received from the parent and/or other components associated with the item. Thus, a rule can be modeled that enables an item to inherit a security policy along the branches of a path from a root of the hierarchy to the respective item in accordance with the hierarchical structure. Also, if a more traditional tree arrangement is encountered, such as in the case if there is one path between a root node of a tree to the respective data item, then alternative mapping of security policies may be applied. By providing various approaches for mapping security policies depending on the type of hierarchy encountered, the present invention provides a robust security model that facilitates system performance and promotes stability by mitigating uncertainty associated with conventional security techniques.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 4 is a diagram illustrating an example access mask in accordance with an aspect of the present invention.

DETAILED DESCRIPTION OF THE INVENTION

The present invention relates to a system and methodology to facilitate security for data items residing within (or associated with) a hierarchical database or storage structure (e.g., hierarchical tree branching to various nodes). In one aspect, a database security system is provided having a hierarchical data structure associated with one or more data items. The system includes a security component that applies a security policy to the data items from a global location or region associated with a database. Various components and processes are employed to enable explicit and/or inherited security properties to be received by and propagated to the data items depending on the type of data structure encountered or processed. By associating security policies and/or properties at a global, volume, or regional level of the database—in contrast to the item level, database processing operations are mitigated over conventional systems that generally link individual security files with respective data items residing in the database.

As used in this application, the terms "component," "tree," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
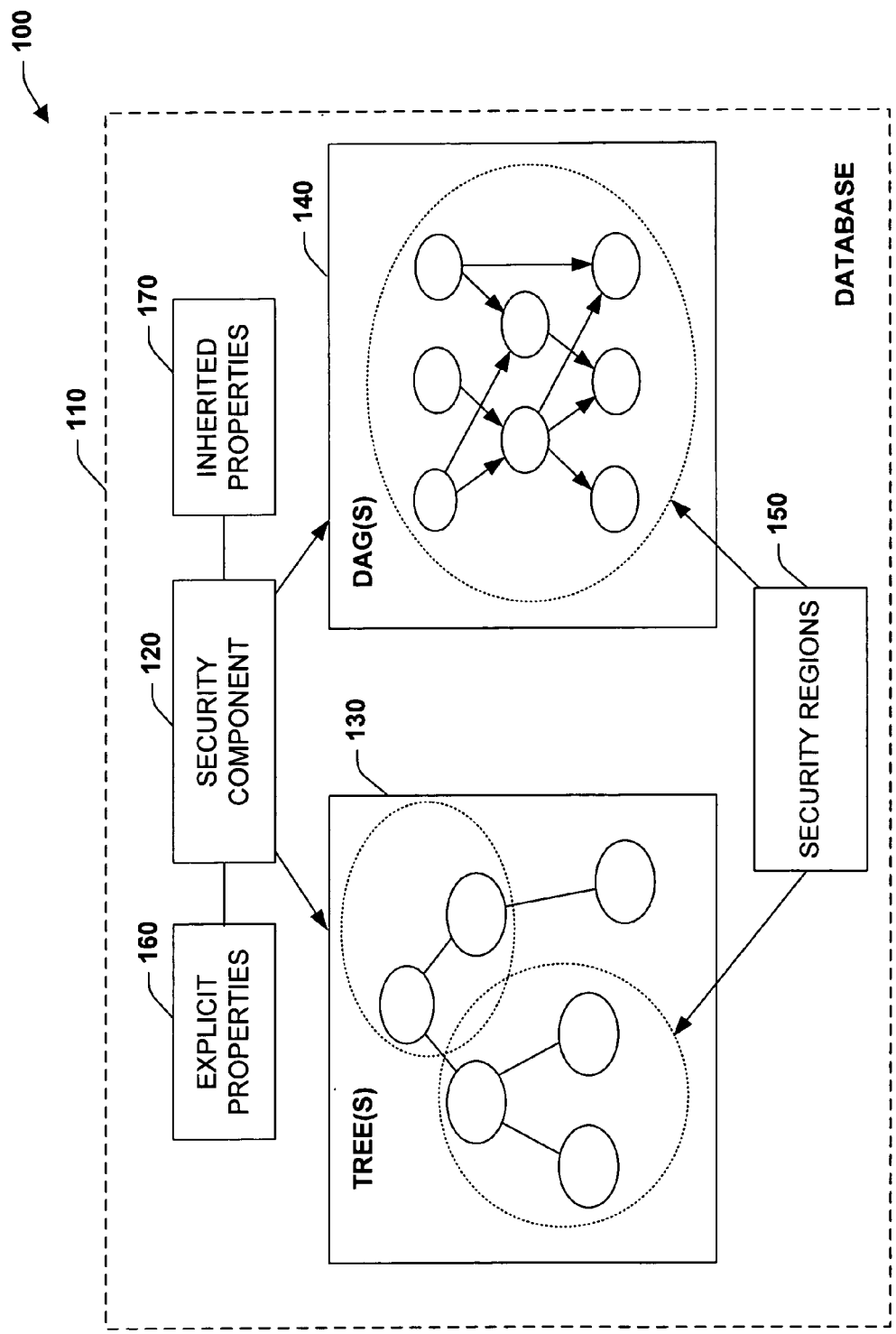
FIG. 1 is a schematic block diagram of a database security system and model in accordance with an aspect of the present invention.

Referring initially to FIG. 1, a database security system and model 100 is illustrated in accordance with an aspect of the present invention. The system 100 includes a database 110 having a security component 120 (or components) that are administered from a global or regionalized location within the database (can also be administered from remote locations outside the database). The database 120 includes one or more hierarchical structures 130 and 140. Such hierarchies can include substantially any type of hierarchically arranged data items (illustrated as elliptical nodes) such as common tree structures at 130 or more elaborate data structures such as a containment hierarchy 140 that is generally modeled as a Directed Acyclic Graph (DAG). Although the tree 130 and containment hierarchy 140 (also referred to as DAG) are illustrated, it is to be appreciated that the security model of the present invention can be applied to substantially any type of hierarchical data structure. As will be described in more detail below, various processes and components are employed to administer security policies from the security component 120 to the respective hierarchies 130 and 140.

In one aspect of the present invention, the security component 120 enables security policies to be applied in more global manner such as from one or more security regions 150 that are mapped within/from the database 110. These policies can include explicitly defined policies or properties at 160 and/or more generalized policies or properties at 170 that can be inherited from various portions of a path or region associated with the type of data structure involved. For example, security policies can be applied in one manner for the tree structure 130 and a subsequent manner for the DAG 140, if desired.

As noted above, various components and processes are provided to enable security policies to automatically be associated with database items. These components define a security model that maps a security policy from the security component 120 to a respective item in the hierarchies 130 and 140 depending on the type of data structure employed. For example, in one type of structure, a containment hierarchy may include various holding relationships between items appearing in the hierarchy. The holding relationship may be employed to propagate a security policy for a respective item, wherein the policy may include an explicit portion 160 (e.g., defined by a system administrator) and/or an inherited portion 170 received from the parent and/or other components associated with the item. Thus, rules can be provided that enable an item to inherit a security policy along the branches of a path from a root of the hierarchy to the respective item in accordance with the hierarchical structure. Also, if a more traditional tree arrangement is encountered, such as in the case if there is one path between a root node of a tree to the respective data item, then alternative mapping of security policies may be applied.

It is noted that database 110 and/or hierarchies 130/140 can be modeled as an item store (e.g., memory region in the database). The granularity at which security policy can be specified and enforced is generally at the level of various operations on an item in a given store. In general, the security component 120 (or model) specifies a set of principals that can be granted or denied access to perform these operations on an item through, for example, Access Control Lists (ACL's). Respective ACL's are typically an ordered collection of Access Control Entries (ACE's) which are described in more detail below.

The security policy for an item can be described by discretionary access control policy and the system access control policy, for example, wherein these policies can be modeled as a set of ACL's. A first set (Discretionary ACL—DACL's) describes discretionary access granted to various principals by a owner of the item while a second set of ACL's is referred to as SACL's (System Access Control Lists) which specify how system auditing is achieved when an object is manipulated. In addition to these lists, items in an item store are generally associated with a security identifier (SID) that corresponds to the owner of the item (Owner SID).

One aspect for organizing items in an item store is that of the containment hierarchy such as illustrated at 140. Generally, the containment hierarchy is realized via holding relationships between items. For example, holding relationship between two items A and B expressed as "A contains B" enables item A to influence the lifetime of the item B. Typically, an item in an item store cannot exist until there is a holding relationship from another item to it. One exception to this rule is the root of the containment hierarchy. As noted above, the holding relationship in addition to controlling the lifetime of the item provides a component for propagating the security policy for an item.

The security policy specified for respective items generally include two (or more) portions—a portion that is explicitly specified for that item and a portion that is inherited from the parent of the item in the item store. The explicitly defined security policy for an item may also include two (or more) portions—a portion that governs access to the item under consideration and a portion that influences the security policy inherited by its descendants in the containment hierarchy or other hierarchical structure. The security policy inherited by a descendant is a generally function of the explicitly defined policy and the inherited policy.

Figure 2:
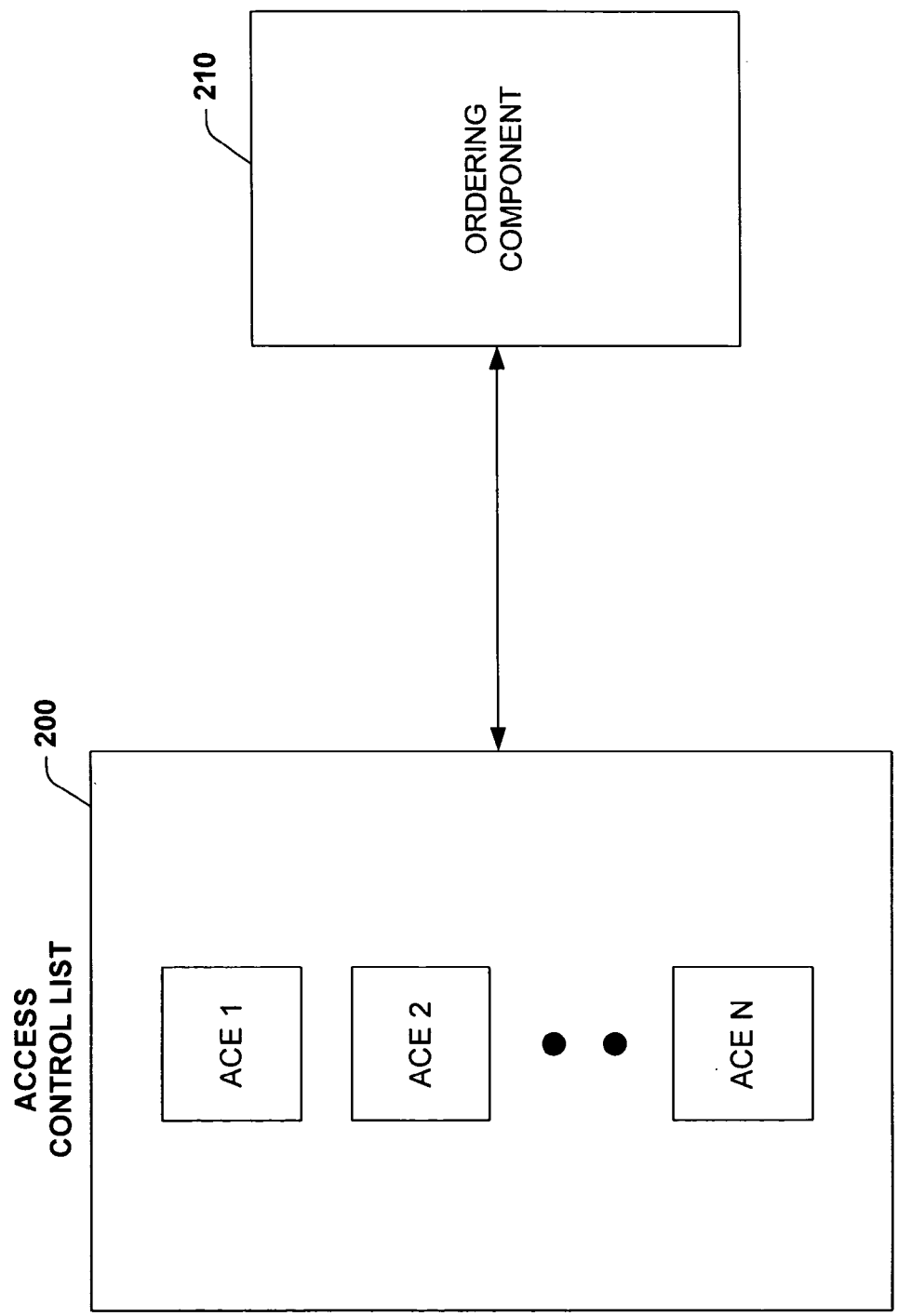
FIG. 2 is a diagram of an access control list and ordering component in accordance with an aspect of the present invention.

Referring now to FIG. 2, an access control list 200 and ordering component 210 are illustrated in accordance with an aspect of the present invention. As noted above, security policies are generally propagated through holding relationships in a containment hierarchy. Since the security policy is propagated through holding relationships and can also be overridden at an item, the following describes how the effective security policy for an item is determined. For example, an item in a containment hierarchy inherits an ACL along the paths from the root of the item store to the item. Within the inherited ACL for a given path, the ordering of the various Access Control Entries (ACE's) in the ACL 200 generally determines the final security policy that is enforced. The following notation describes the ordering of ACE's in an ACL via the ordering component 210.

The ordering of the ACE's in an ACL that is inherited by an item can be determined by the following rules:

Rule 1

For inherited ACL's (L) on item (I)

For items I1, I2

For ACE's A1 and A2 in L,

I1 is an ancestor of I2 and

I2 is an ancestor of I3 and

A1 is an ACE inherited from I1 and

A2 is an ACE inherited from I2

Implies

A2 precedes A1 in L

The above rule stratifies the ACE's inherited from the various items in a path to the item I from the root of the containment hierarchy. The ACE's inherited from a closer container take precedence over the entries inherited from a distant container. Intuitively, this allows an administrator the ability to override ACE's inherited from farther up in the containment hierarchy.

The following rule orders the ACE's that deny access to an item ahead of the ACE's that grant access to an item.

Rule 2

For inherited ACL's (L) on item (I)

For items I1

For ACE's A1 and A2 in L,

I1 is an ancestor of I2 and

A1 is an ACCESS_DENIED_ACE inherited from I1 and

A2 is an ACCESS_GRANTED_ACE inherited from I1

Implies

A1 precedes A2 in L

Figure 3:
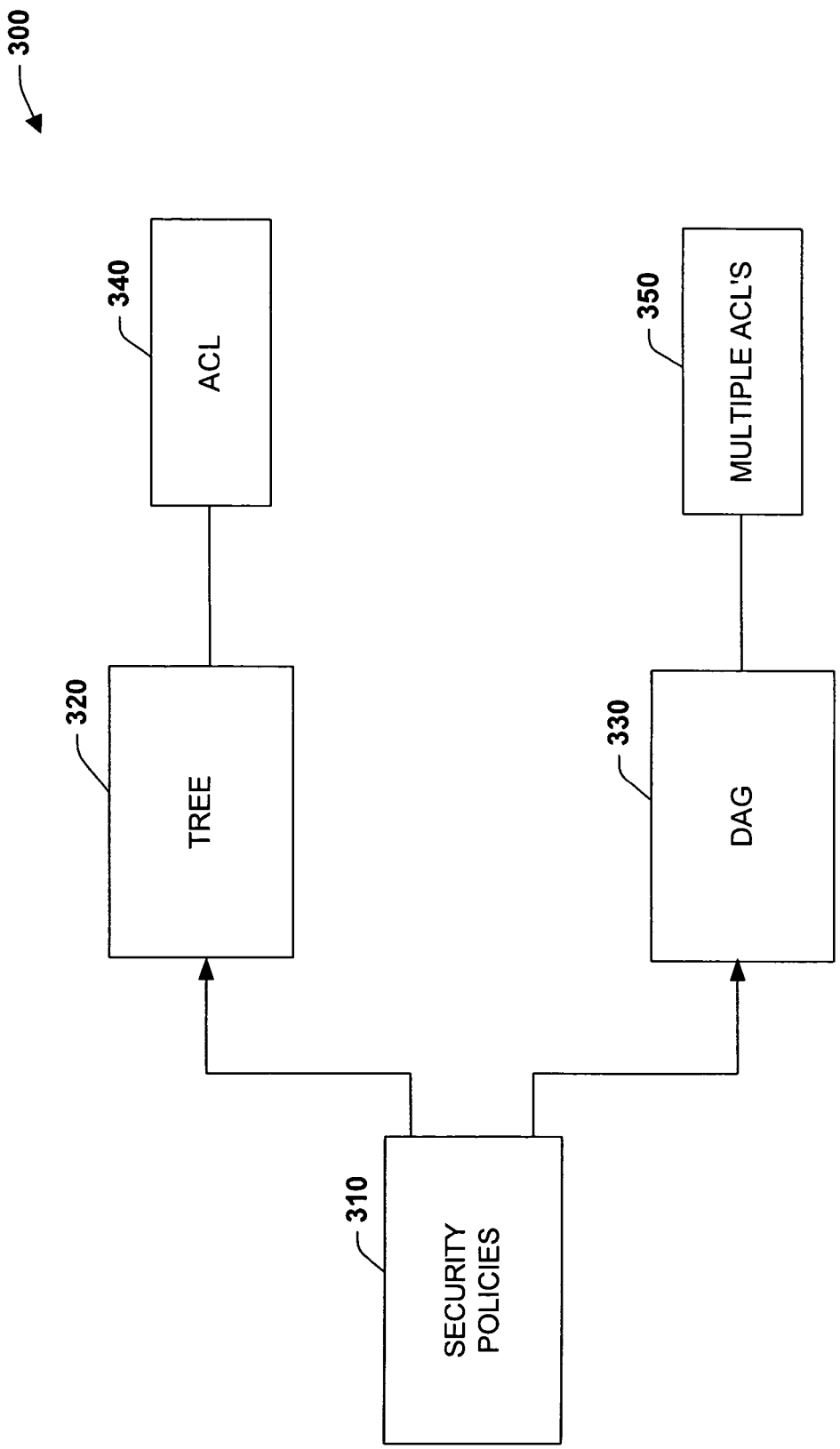
FIG. 3 is a diagram illustrating security policy distribution in accordance with an aspect of the present invention.

Turning to FIG. 3, a system 300 illustrates security policy distribution in accordance with an aspect of the present invention. The system 300 deploys one or more security policies 310 to a tree structure 320 and/or a DAG 330. In the case of a containment hierarchy being a tree 320 there is one path from the root of the tree to the item and the item thus has one inherited ACL at 340. Under these circumstances, the ACL inherited by an item matches the ACL inherited by a file (item) in existing security models in terms of the relative ordering of the ACE's within them. However, when the containment hierarchy is a Directed Acyclic Graph (DAG) 330, multiple holding relationships are permitted to items. Under these conditions there are multiple paths to an item from the root of the containment hierarchy. Since an item inherits an ACL along the paths the items are associated with, a collection of ACL's as opposed to a single one are employed at 350.

It is noted that the above-described model is different from the file system model where exactly one ACL is associated with a file or folder. Thus, for the legacy interfaces, the system 300 can return an ACL associated with the particular path over which the item was accessed. However, for item-store models, a set of ACL's associated with the item can be returned.

There are typically two aspects that are to be elaborated when the containment hierarchy is a DAG 330 as opposed to a tree 320. In one aspect, the model provides a description how the effective security policy for an item is computed when it inherits more than one ACL from its parents and how items are organized and represented affect the administration of the security model for an item store.

The following algorithm evaluates access rights for a given principal to a given item. Before proceeding with the algorithm, the following notation describes ACL's associated with an item.

Inherited_ACLs(ItemId)—a set of ACL's that can be inherited by an item, wherein the item identity can be an ItemId from its parents in the store.

Explicit_ACL(ItemId)—an ACL explicitly defined for the item whose identity is ItemId.

```
STATUS
ACLAccessCheck(
        PSID              pOwnerSid,
        PDACL             pDacl,
        DWORD             DesiredAccess,
        HANDLE            ClientToken,
        PPRIVILEGE_SET    pPrivilegeSet,
        DWORD             *pGrantedAccess)
```

The above routine returns STATUS_SUCCESS if the desired access was not explicitly denied and pGrantedAccess determines which of the rights desired by the user were granted by the specified ACL. If the desired access was explicitly denied the routine returns STATUS_ACCESS_DENIED.

```
STATUS
ItemAccessCheck(
        OS_ITEMID         ItemId,
        DWORD             DesiredAccess,
        HANDLE            ClientToken,
        PPRIVILEGE_SET    pPrivilegeSet)
{
        STATUS            Status;
        PDACL             pExplicitACL = NULL;
        PDACL             pInheritedACLs = NULL;
        DWORD             NumberOfInheritedACLs = 0;
        pExplicitACL = GetExplicitACLForItem(ItemId);
        GetInheritedACLsForItem(ItemId,&pInheritedACLs,
        &NumberOfInheritedACLs)
        Status = ACLAccessCheck(
                        pOwnerSid,
                        pExplicitACL,
                        DesiredAccess,
                        ClientToken,
                        pPrivilegeSet,
                        &GrantedAccess);
        if (Status != STATUS_SUCCESS)
                return Status;
        if (DesiredAccess == GrantedAccess)
                return STATUS_SUCCESS;
        for (
i = 0;
(i < NumberOfInheritedACLs && Status == STATUS_SUCCESS);
i++) {
GrantedAccessForACL = 0;
        Status = ACLAccessCheck(
                        pOwnerSid,
                        pExplicitACL,
                        DesiredAccess,
                        ClientToken,
                        pPrivilegeSet,
                        &GrantedAccessForACL);
        if (Status == STATUS_SUCCESS) {
                GrantedAccess |= GrantedAccessForACL;
        }
}
If ((Status == STATUS_SUCCESS) &&
        (GrantedAccess != DesiredAccess)) {
                Status = STATUS_ACCESS_DENIED;
        }
        return Status;
}
```

It is noted that the sphere of influence of the security policy defined at an item covers the descendants of the item in the containment hierarchy defined on the item store. For items where an explicit policy is defined, then the effect is similar to defining a policy that is inherited by its descendants in the containment hierarchy. The effective ACL's inherited by the descendants can be obtained by taking the ACL's inherited by the item and adding the inheritable ACE's in the explicit ACL to the beginning of the ACL (unless a flag is set specifying that propagated ACE's are not to be inherited). This is referred to as the set of inheritable ACL's associated with the item.

In the absence of explicit specification of security in the containment hierarchy rooted at a folder item, the security specification of the folder generally applies to all the descendants of that item in the containment hierarchy. Thus, every item for which an explicit security policy specification is provided defines a region of similarly protected items and the effective ACL's for all the items in the region is the set of inheritable ACL's for that item. This would completely define the regions in the case of a containment hierarchy that is a tree. If each region were to be associated with a number, then it would be sufficient to merely include the region to which an item belongs along with the item.

For containment hierarchies that are DAG's, the points in the containment hierarchy at which the effective security policy changes is generally determined by two types of items:

Items for which an explicit ACL has been specified. Typically these are the points in the containment hierarchy where an administrator has explicitly specified an ACL; and Items that have more than one parent and the parents have different security policies associated with them. Typically these are the items that are the confluence points of security policy specified for a volume of items and indicate the beginning of a new security policy.

With the above definition, the items in the item store fall generally into one of two categories—those that are the root of a similarly protected security region and those that are not. The items that do not define security regions generally belong to one security region. As in the case of trees, the effective security for an item can be specified by specifying the region to which an item belongs. This leads to a straightforward model for administering the security of an item store based upon the various similarly protected regions in the store.

Figure 5:
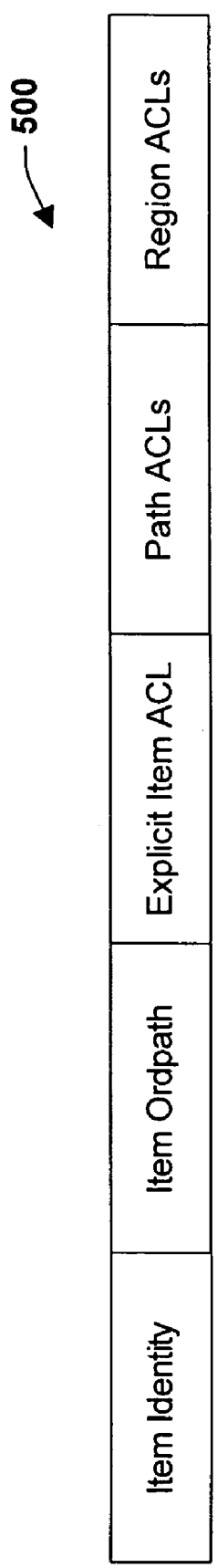
FIG. 5 is a diagram illustrating an example data structure for similarly protected security regions in accordance with an aspect of the present invention.
Figure 6:
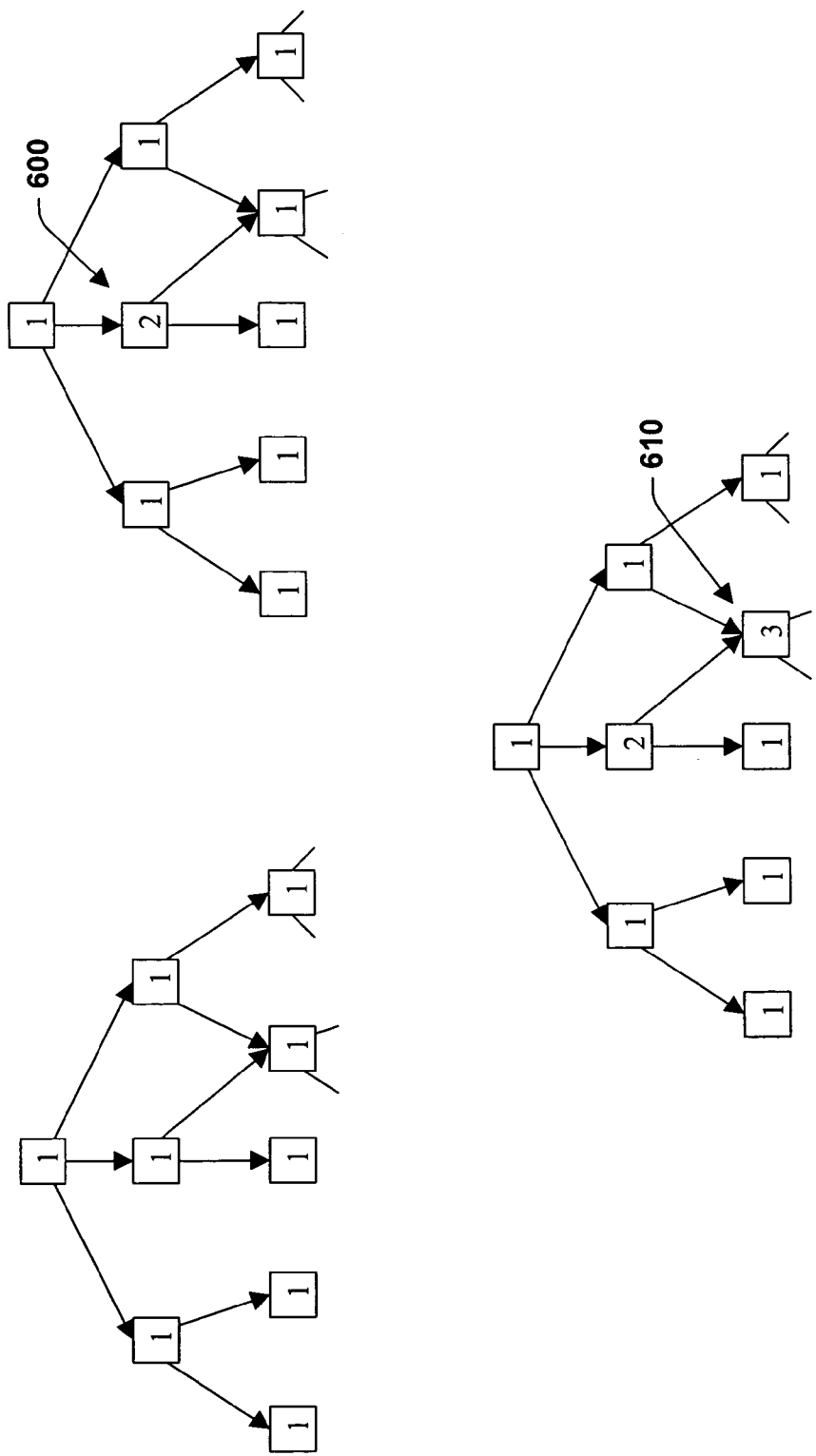
FIG. 6 is a diagram illustrating security region creation in accordance with an aspect of the present invention.

The following discussion relating to FIGS. 4-6 is related to more detailed descriptions of security policies and/or security implementations that may be employed in accordance with the present invention. For example, although detailed bit mappings may be described, it is to be appreciated that the present invention is not limited to the particular implementations so described (e.g., other bit mappings and/or implementations possible).

In general, a security descriptor includes security information associated with a securable object. A security descriptor includes a SECURITY_DESCRIPTOR structure and its associated security information. The security descriptor can include the following security information:

SID's for the owner and primary group of an object.

A DACL that specifies the access rights allowed or denied to particular users or groups.

An SACL that specifies the types of access attempts that generate audit records for the object.

A set of control bits that qualify the meaning of a security descriptor or its individual members.

Applications should not directly manipulate the contents of a security descriptor. Application Programming Interface (API) functions can be provided for setting and retrieving the security information in an object's security descriptor. In addition, there are functions for creating and initializing a security descriptor for a new object.

A discretionary access control list (DACL) identifies trustees that are allowed or denied access to a securable object. When a process attempts to access a securable object, the system checks the ACEs in the object's DACL to determine whether to grant access to it. If the object does not have a DACL, the system can grant full access. If the object's DACL has no ACEs, the system denies attempts to access the object because the DACL does not allow access rights. The system checks the ACEs in sequence until it finds one or more ACEs that allow the requested access rights, or until the requested access rights are denied.

A system access control list (SACL) enables administrators to log attempts to access a secured object. The ACE specifies the types of access attempts by a specified trustee that cause the system to generate a record in a security event log. An ACE in a SACL can generate audit records when an access attempt fails, when it succeeds, or both. Also, an SACL can raise an alarm when an unauthorized user attempts to gain access to an object. Generally, ACEs contain the following access control information:

A security identifier (SID) that identifies the trustee to which the ACE applies.

An access mask that specifies the access rights controlled by the ACE.

A flag that indicates the type of ACE.

A set of bit flags that determine whether child containers or objects can inherit the ACE from the primary object to which the ACL is attached.

The following table lists possible ACE types supported by securable objects.

| Type | Description |
| --- | --- |
| Access-denied ACE | Used in a DACL to deny access rights to a trustee. |
| Access-allowed ACE | Used in a DACL to allow access rights to a trustee. |
| System-audit ACE | Used in a SACL to generate an audit record when the trustee attempts to exercise the specified access rights. |

In one aspect, securable objects can arrange their access rights via the access mask format (other formats possible) illustrated in a mask 400 in FIG. 4. In this format, the low-order 16 bits are for object-specific access rights, the next 7 bits are for standard access rights, which apply to most types of objects, and the 4 high-order bits are employed to specify generic access rights that object types can map to a set of standard and object-specific rights. An (AS bit) ACCESS_SYSTEM_SECURITY bit corresponds to the right to access the object's SACL.

Generic rights are specified in the 4 high-order bits within the mask 400. Generally, each type of securable object maps these bits to a set of its standard and object-specific access rights. For example, one type of file object can map the GENERIC_READ bit to the READ_CONTROL and SYNCHRONIZE standard access rights and to the FILE_READ_DATA, FILE_READ_EA, and FILE_READ_ATTRIBUTES object-specific access rights.

Other types of objects map the GENERIC_READ bit (GR) to the set of access rights suitable for that type of object. Generic access rights can be utilized to specify the type of access desired when opening a handle to an object, for example. This is typically simpler than specifying all the corresponding standard and specific rights. The following table depicts possible constants defined for generic access rights.

| Constant | Generic meaning |
| --- | --- |
| GENERIC_ALL | Read, write, and execute access |
| GENERIC_EXECUTE | Execute access |
| GENERIC_READ | Read access |
| GENERIC_WRITE | Write access |

Generally, each type of securable object has a set of access rights that correspond to operations specific to that type of object. In addition to these object-specific access rights, there is a set of standard access rights that correspond to operations common to most types of securable objects. The following table depicts possible constants defined for standard access rights.

| Constant | Meaning |
| --- | --- |
| DELETE | The right to delete the object. |
| READ_CONTROL | The right to read the information in the object's security descriptor, not including the information in the SACL. |
| SYNCHRONIZE | The right to use the object for synchronization. This enables a thread to wait until the object is in the signaled state. Some object types do not support this access right. |
| WRITE_DAC | The right to modify the DACL in the object's security descriptor. |
| WRITE_OWNER | The right to change the owner in the object's security descriptor. |

FIG. 5 illustrates an example data structure 500 for similarly protected security regions in accordance with an aspect of the present invention. Items that define similarly protected regions have an entry associated with them in the security table as illustrated at 500. The security table is defined as follows:

Item Identity—This is the Item Identity of the root of a similarly protected security region.

Item Ordpath—This is the ordpath associated with the root of the similarly protected security region.

Explicit Item ACL—This is the explicit ACL defined for the root of the similarly protected security region. In some cases this can be NULL, (e.g., when a new security region is defined because the item has multiple parents belonging to different regions).

Path ACLs—This is the set of ACL's inherited by the item.

Region ACLs—This is the set of ACL's defined for the similarly protected security region associated with the item. This differs from the Inherited ACL's column when the explicit column has a non-NULL value.

The computation of effective security for an item in a given store leverages the table 500. In order to determine the security policy associated with an item, the security region associated with the item is analyzed and the ACL's associated with that region are retrieved. As the security policy associated with item is changed (e.g., by directly adding explicit ACL's or indirectly by adding holding links that results in the formation of new security regions) the security table 500 should be kept up to date to facilitate that the above algorithm for determining the effective security of an item is valid. Possible algorithms to maintain the security table are as follows:

Creating a new item in a container—

When an item is newly created in a container it inherits the ACL's associated with the container. Since the newly created item has one parent it belongs to the security region as its parent. Thus, there is typically no need to create a new entry in the security table.

Adding an explicit ACL to an item—

When an ACL is added to an item it defines a new security region for its descendants in the containment hierarchy that belong to the same security region as the given item itself. For the items that belong to other security regions but are descendants of the given item in the containment hierarchy, the security region remains unchanged but the effective ACL associated with the region is changed to reflect the addition of the new ACL. The introduction of this new security region can trigger further region definitions for those items which have multiple holding links with ancestors that straddle the old security region and the newly defined security region. For such items, a new security region can be defined and the procedure repeated.

FIG. 6 depicts a new similarly protected security region being created out of an existing security region by introducing a new explicit ACL. This is indicated by the node marked 2 at reference numeral 600. However, the introduction of this new region results in an additional region 3 being created at reference numeral 610 due to an item having multiple holding links. The following sequence of updates to the security tables reflect the factoring of similarly protected security regions.

Adding a holding link to an item—

When a holding link is added to an item it typically gives rise to one of three possibilities. If the target of the holding link, i.e., the item under consideration is the root of a security region, the effective ACL associated with the region is changed and no further modifications to the security table is generally required. If the security region of the source of the new holding link is identical to the security region of the existing parents of the item, then typically no changes are required. However, if the item now has parents that belong to different security regions, then a new security region is formed with the given item as the root of the security region. This change is propagated to the items in the containment hierarchy by modifying the security region associated with the item. The items that belong to the same security region as the item under consideration and are its descendants in the containment hierarchy should be changed. When the change is made, the items that have multiple holding links should be examined to determine if further changes are required. Further changes may be required if any of the items have parents of different security regions.

Deleting a holding link from an item—

When a holding link is deleted from an item it is possible to collapse a security region with its parent region if certain conditions are satisfied. More precisely this can be accomplished under the following conditions—

If the removal of the holding link results in an item that has only one parent and no explicit ACL is specified for that item.

If the removal of the holding link results in an item whose parents are all in the same security region and no explicit ACL is defined for that item. Under these circumstances the security region can be marked to be the same as the parent. This marking should be applied to all the items whose security region corresponds to the region being collapsed.

Deleting an explicit ACL from an item—

When an explicit ACL is deleted from an item it is possible to collapse the security region rooted at that item with that of its parents. More precisely, this can be achieved if the removal of the explicit ACL results in an item whose parents in the containment hierarchy belong to the same security region. Under these circumstances the security region can be marked to be the same as the parent and the change applied to the items whose security region corresponds to the region being collapsed.

Modifying an ACL associated with an item—

In this case, no new additions to the security table are generally required. The effective ACL associated with the region is updated and the new ACL change is propagated to the security regions that are affected by it.

Figure 7:
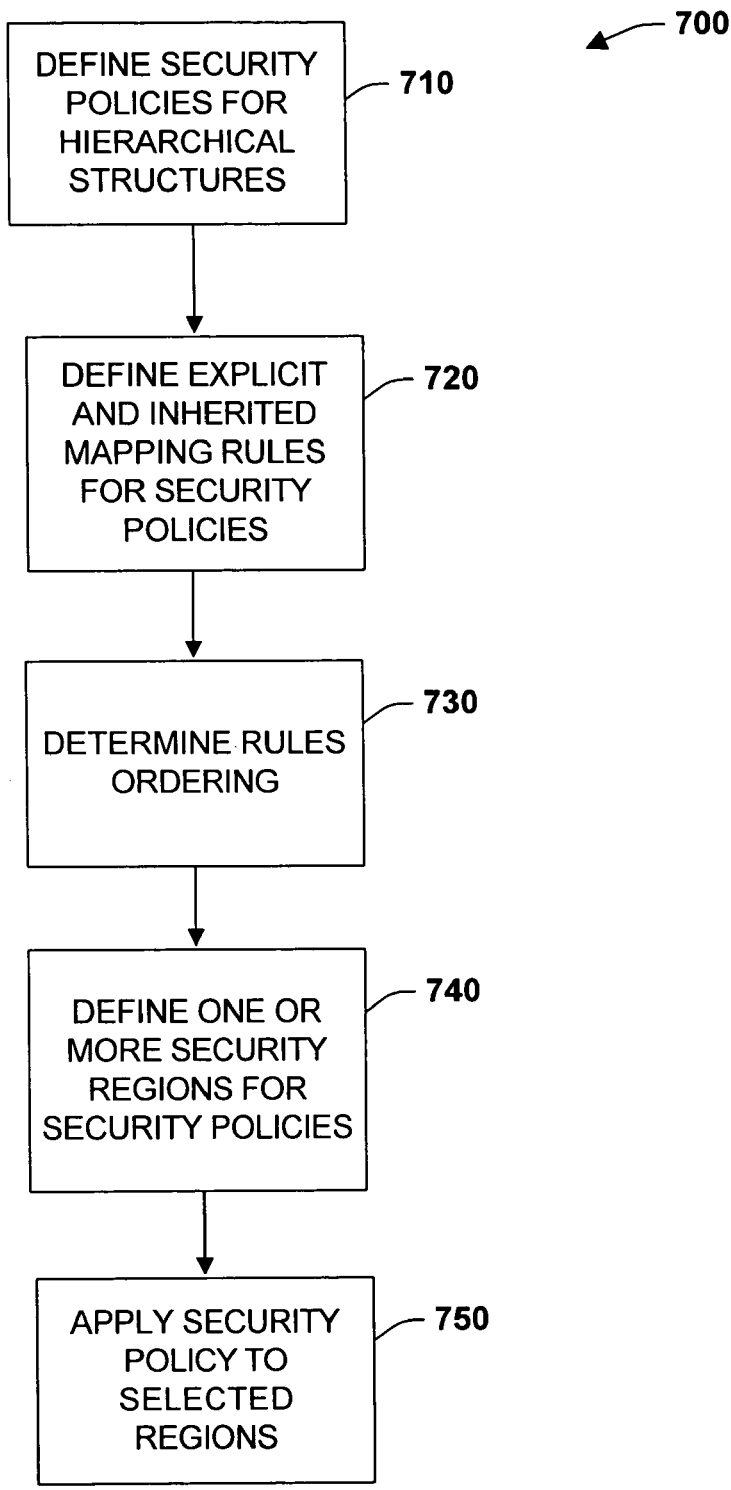
FIG. 7 is a flow diagram illustrating a security process in accordance with an aspect of the present invention.

FIG. 7 is a flow diagram illustrating a security process 700 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 710 of FIG. 7, one or more security policies are defined for hierarchical structures. As noted above, this can include common tree structures and other structures such as containment hierarchies. Also, hybrid structures are possible having some aspects of tree arrangements and some aspects relating to containment hierarchies. Security policies can be provided in such devices as Access Control Lists having one or more Access Control Entries that describe the respective policy therein. At 720, explicit and/or inherited mapping rules are defined for the security policies. Such rules can include override functions in the case of explicit mappings, whereas other rules provide for how policies will be mapped in a more complex arrangement such as a containment hierarchy whereby multiple holding relationships are possible. At 730, ordering for respective rules and policies are determined. For example, Access Control Entries can be arranged within the Access Control List depending on the type of structure and/or hierarchical relationship encountered. At 740, one or more security regions are defined for a given hierarchical structure. At 750, one or more security policies are applied to selected regions defined at 740.

Figure 8:
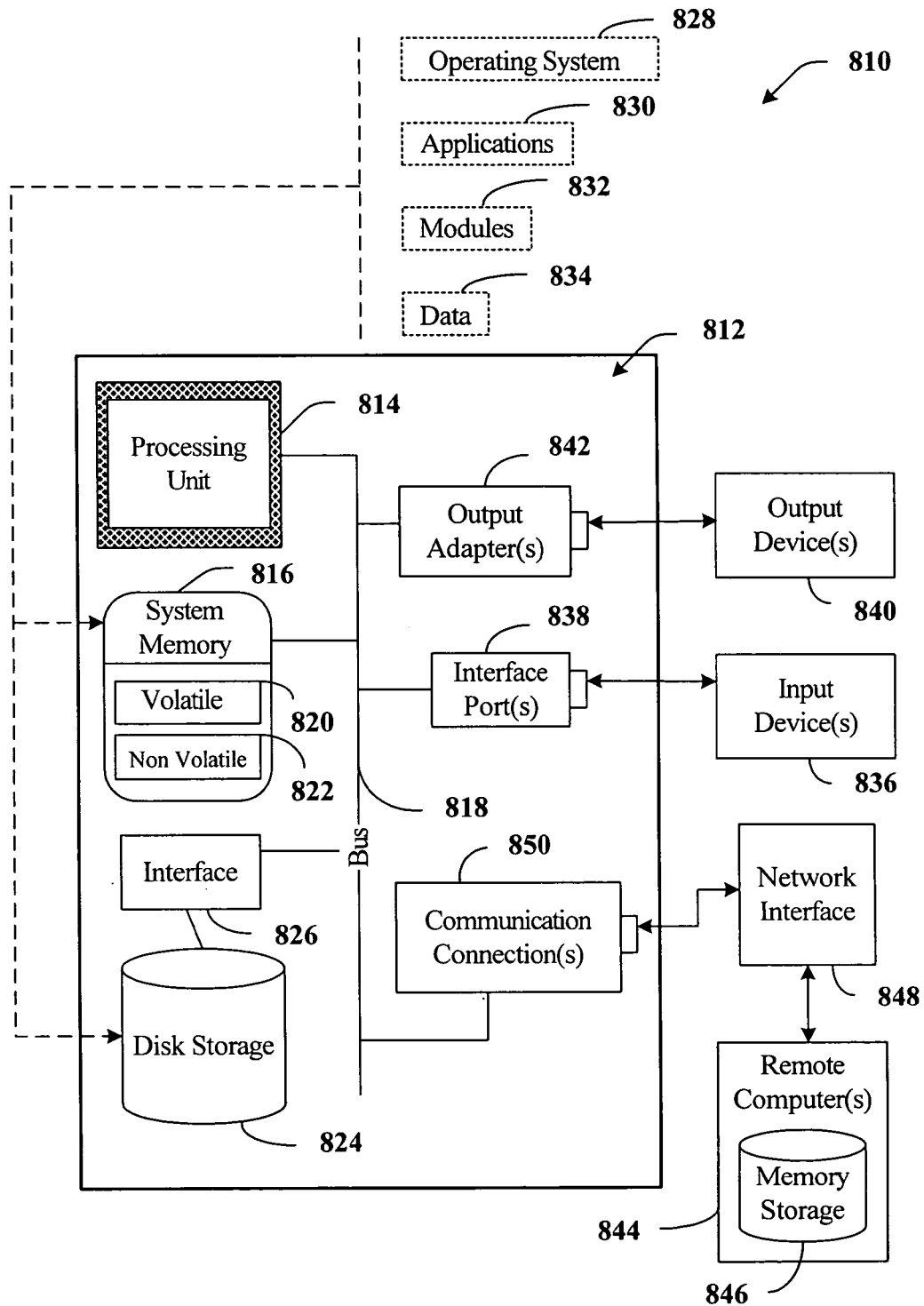
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840.

Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
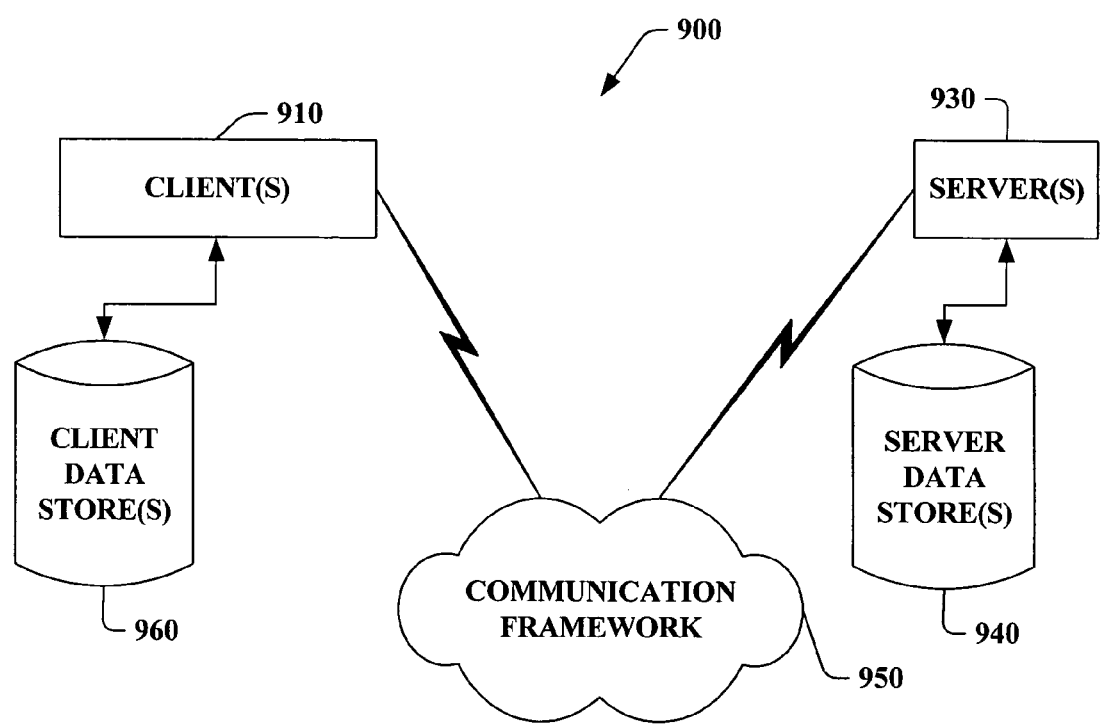
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data security system that facilitates securing a data item comprising:
    a computer-readable memory comprising a data store that includes at least one hierarchical data structure that comprises a plurality of data items; and
    a security component stored in the computer-readable memory that automatically applies at least one of a plurality of security policies to at least a first subsection of the data store and arranges the order of a plurality of Access Control Entries (ACE) in an Access Control List (ACL), wherein said arranges the order is done by an ordering component, based at least upon detection of type of the at least one hierarchical data structure, the at least one of a plurality of security policies employs the ACL.

2. The system of claim 1, the at least one hierarchical data structure is at least one of a tree structure and a containment hierarchy.

3. The system of claim 2, the containment hierarchy is modeled as a Directed Acyclic Graph (DAG).

4. The system of claim 1, the at least one of a plurality of security policies is mapped from within the data store.

5. The system of claim 1, the at least one of a plurality of security policies is at least one of explicitly mapped to an item and inherited by an item.

6. The system of claim 1, the Access Control List is associated with a holding relationship of a containment hierarchy.

7. The system of claim 6, further comprising a plurality of Access Control Lists that describe discretionary access rights for an item within the containment hierarchy.

8. The system of claim 1, the security component specifies a set of principals that are granted or denied access to perform operations on an item.

9. The system of claim 1, the security component includes at least one of discretionary access control list, a system access control list, and a security identifier.

10. The system of claim 1, further comprising utilization of the following ordering algorithm by the security component:

For inherited ACL's (L) on data item (I)
For items I1, I2
For ACE's A1 and A2 in L,
    I1 is an ancestor of I2 and
    I2 is an ancestor of I3 and
    A1 is an ACE inherited from I1 and
    A2 is an ACE inherited from I2
Implies
    A2 precedes A1 in L,
wherein L and I are integers.

11. The system of claim 1, further comprising utilization of the following ordering algorithm by the security component:

For inherited ACL's (L) on data item (I)
For items I1
For ACE's A1 and A2 in L,
    I1 is an ancestor of I2 and
    A1 is an ACCESS_DENIED_ACE inherited from I1 and
    A2 is an ACCESS_GRANTED_ACE inherited from I1
Implies
    A1 precedes A2 in L,
wherein L and I are integers.

12. The system of claim 1, further comprising a component that evaluates access rights for a given principal to a given data item.

13. The system of claim 1, the security component further comprises an effective access control list that is obtained by processing lists inherited by an item and adding inheritable access control entries in an explicit access control list.

14. The system of claim 1, the security component further comprises an access mask specifying at least one of object-specific access rights, standard access rights, and generic access rights.

15. The system of claim 1, further comprising a security table for similarly protected security regions.

16. The system of claim 15, the security table includes at least one of the following fields: an Item Identity, an Item Ordpath, an Explicit Item, a Path ACL, and a Region ACL.

17. The system of claim 1, further comprising a component that does at least one of create a new item in a container, add an explicit ACL to an item, add a holding link to an item, delete a holding link from an item, delete an explicit ACL from an item and modify an ACL associated with an item.

18. A computer readable medium having computer readable instructions stored thereon for implementing the security component of claim 1.

* * * * *